United States Patent Office 2,917,470
Patented Dec. 15, 1959

2,917,470

PROCESS OF PRODUCING POLYOLEFIN OXIDES WITH METALLIC SULFATE CATALYSTS

Wilbur L. Bressler and Arthur E. Gurgiolo, Lake Jackson, Tex., assignors to The Dow Chemical Company, Midland, Mich., a corporation of Delaware No Drawing. Application June 26, 1958
Serial No. 744,636

7 Claims. (Cl. 260—2)

The present invention relates to a new and useful method of producing polyolefin oxides. More particularly, the present invention concerns a new and useful catalyst and the method of employing said catalyst to prepare polyalkylene oxides with very high molecular weights i.e. about or greater than 10,000.

It is well known that ethylene oxide can be polymerized to form polymers in the low molecular weight range of 200 to 8000 with an alkali metal, alkali hydroxide, or alkoxide catalyst. However, the production of, for example, polyethylene oxide in the molecular weight range of 20,000 to 50,000 with these known catalysts is slow and time-consuming. This retarded reaction rate is theorized as attributable to increase in molecular weight of the polymer. Propylene oxide can also be polymerized in the presence of substantially the same alkali catalysts to give polymers with molecular weights as high as 4000, but here again, excessive reaction times are involved even with these relatively low molecular weight polymers.

Staudinger and his collaborators, Ber. 62, 2395 (1929) show that metallic sodium and/or potassium, tertiary amines, and anhydrous stannic chloride ($SnCl_4$) can be used as catalysts to produce low molecular weight polyethylene oxides. They also teach the use of sodamide and the oxides and carbonates of calcium, strontium, and zinc to slowly produce polyethylene oxide of molecular weights of 100,000 or more at 20° C., and more rapidly at 100° C. [Annal. de Chimie, 505, 41 (1933)]. Recent Belgian Patents No. 557,776 and 557,830-4 teach that carbonates of divalent metals having an atomic number equal to eleven or higher, and in between potassium and tin in the electromotive series, are capable of producing very high molecular weight polymers of ethylene oxide. These catalysts must be of a very high purity and are therefore expensive and difficult to prepare and maintain.

In U.S. Patent No. 1,921,378, vapors of ethylene oxide and propylene oxide were passed over solid KOH, $NaHSO_4$, or $Na_2SO_4$ between 40 and 200° C. to produce various polymerization products. British Patent No. 346,550 teaches the polymerization of ethylene oxide and propylene oxide by passing the vapor over KOH, $NaHSO_4$ and phosphates and $Al_2(SO_4)_3$. When employing KOH, waxes are produced, whereas the others produce dioxane and its homologues.

It is an object of the present invention to provide a polymerization procedure to produce high molecular weight polyolefin oxides having a molecular weight greater than about 10,000. Another object is to provide a method for preparing water-soluble polymers of olefin oxides having a molecular weight greater than about 10,000. A still further object is to provide a method for preparing polymers of olefin oxides in the absence of a reaction solvent or wherein an inert reaction solvent is utilized but in which the monomer alone is soluble. An additional object is to set forth a method for preparing polymers of olefin oxides wherein an inert reaction solvent is utilized in which both monomer and polymer are soluble. These and other objects will become apparent to those skilled in the art from the following description and claims.

It has now been found that high molecular weight polyolefin oxides can be produced by heating an olefin oxide at a temperature from about 40° to about 170° C. in the presence of a divalent metallic sulfate. Good results have been obtained when the metallic sulfate is employed in a concentration of from about 0.01 to 5 percent by weight based on the weight of olefin oxide. When an inert solvent, in which either the monomer or polymer or both monomer and polymer are soluble, is used, it is preferably employed in an amount of from between 5 and 95 percent by weight based on the weight of the total charge.

Accurate molecular weight determinations being difficult to obtain, the usual procedure is to obtain the viscosity, which has been correlated to molecular weight. The viscosity is hereinafter employed as a relative indication of molecular weight.

The metallic sulfates which catalyze the polymerization of olefin oxides are sulfates of divalent elements having atomic numbers from 12 to 56 inclusive and appearing below potassium and above hydrogen in the Electromotive Series of the Elements as shown in "Handbook of Chemistry and Physics," 34th edition (1952), Chemical Rubber Publ. Co., i.e., magnesium, calcium, chromium, manganese, iron, cobalt, nickel, zinc, strontium, cadmium, tin, and barium. Water of crystallization can be present to the extent of 25–35 percent by weight of the catalyst employed. Reaction time (including induction time) will vary from a few hours to 72 hours depending on the particular metallic sulfate. However, the more active sulfates give complete conversion of olefin oxide to polymer in 24 hours or less.

The temperature at which the polymerization takes place is within the range of 40° C. to 170° C. and preferably is from 100° to 130° C. When operating much below 70° C., the reaction proceeds so sluggishly that several days are needed to induce polymerization and when operating much above 170° C., the molecular weight of the polymer decreases due to decomposition.

With due regard to catalyst activity, good results were obtained with sulfates of calcium, barium, strontium, manganese, iron, zinc, stannous tin, and magnesium. Calcium sulfate can be used as the dihydrate ($CaSO_4 \cdot 2H_2O$) containing 20.93 percent water, the half hydrate ($CaSO_4 \cdot \frac{1}{2} H_2O$) containing 6.2 percent water, the essentially anhydrous $CaSO_4$ containing at least 0.01 percent water or the partially calcined $CaO \cdot CaSO_4$. When the dihydrate is heated to 120° C., the half hydrate is formed by loss of 1½ moles of water and further heating to 300° C. yields substantially anhydrous $CaSO_4$ i.e. containing very minute amounts of water. If this calcium sulfate is heated to 1000° to 1250° C., partial decomposition to the stable $CaO \cdot CaSO_4$ occurs. This compound possesses outstanding catalyst properties and is a preferred catalyst for production of extremely high molecular weight polymers.

While it is desirable to utilize a pure sulfate in order to prevent polymer contamination, it has been found that extremely high purity is not essential for polymer production. C.P. $CaSO_4$ produces a polymer in 24 hours when pulverized. However, if desired, C.P. $CaCO_3$ can be dissolved in half-molar $H_2SO_4$ and the resulting $CaSO_4 \cdot 2H_2O$ precipitated, filtered, washed, and dried, after which it can be used as catalyst. Other sulfates can be prepared by dissolving their respective oxides, hydroxides, or carbonates in $H_2SO_4$ and filtering off the sulfate if insoluble, or evaporating the solution if soluble.

The presence of water as a component of the catalyst either as an absorbed water or water of crystallization (combined) in an amount of more than 30 percent by weight of the catalyst retards the polymerization process and causes an increased induction time. Thus, when the combined water is less than 1 percent by weight, based on olefin oxide (this is about 30 percent by weight based on the catalyst), there is no adverse effect. If the water of crystallization associated with the sulfate exceeds 30 percent (more than 1.5 percent based on the olefin oxide), a long induction period, i.e., the period of time before polymerization begins, is necessary. The effect on the product is such that it becomes a viscous liquid with sharp odors that suggest 1,3-dioxolane or aldehyde formation.

Inert solvents can be employed and for convenience they are divided into two types. Straight- or branched-chain saturated hydrocarbons such as hexane, heptane, petroleum ether, n-octane, etc. in which the monomer but not the polymer is soluble comprise Type I solvents. Type II is the class that dissolves both monomer and polymer and includes the aromatic hydrocarbons such as benzene, toluene, etc. and halogenated aliphatic and aromatic hydrocarbons. The solvent may be used in any desired ratio from 5 to 95 percent by weight of the total charge with the preferred ratio being from 25 to 75 percent.

The following specific examples are illustrative of the methods of this invention.

Example I

A Pyrex tube, 1 inch in outside diameter, 5 inches long, having one end sealed and the other end open but tapering to 8 mm., was cleaned, dried, and purged with nitrogen.

Into this tube was charged 0.075 gram (0.5 percent) of C.P. Mallinckrodt calcium sulfate dihydrate and 15 grams of ethylene oxide. The ethylene oxide was of standard commercial quality, containing 40 p.p.m. water, 30 p.p.m. chloride, .040 p.p.m. aldehyde as acetaldehyde, and 85 p.p.m. non-volatiles. The tube was then cooled to −60° C., sealed, and mounted in a rotating steam autoclave for 24 hours at 130° C. A tough white polymer weighing 15 grams, representing 100 percent conversion, was obtained. The polymer had an intrinsic viscosity of 2.9 and a 0.2 percent solution in acetonitrile had a reduced viscosity of 3.8. The polymer was largely crystalline, water-soluble, and could be molded.

Examples II–XIV

In the manner of Example I, using the tabulated materials, there was obtained white, solid polymers in the indicated yields and having the indicated viscosities.

| Example No. | Alkylene Oxide, in Grams (EO=Alkylene Oxide; PO=Propylene Oxide) | Catalyst in Grams | Percent Catalyst Based on Oxide | Temp., °C. | Time, hr. | Product in Grams | Conversion in Percent | Intrinsic Viscosity | Reduced Viscosity |
|---|---|---|---|---|---|---|---|---|---|
| II | 15 EO | 0.03 $CaSO_4$ | 0.2 | 130 | 48 | white solid 11.4 | 76.0 | 1.25 | 0.35 |
| III | 15 EO | 0.03 $CaSO_4 \cdot 2H_2O$—dried at 120° C. (18 hours) | 0.2 | 120 | 24 | white solid 7.5 | 50 | 1.9 | |
| IV | 15 EO | 0.75 $CaSO_4$ | 0.5 | 200 | 24 | 10.9 | 73 | 0.95 | |
| V | 15 EO | 0.075 $BaSO_4$ | | 130 | 115 | 9.0 | 60 | 0.9 | |
| VI | 15 EO | 0.15 $CaSO_4 \cdot 2H_2O$ | 1.0 | 130 | 24 | 15.0 | 100 | 1.23 | |
| VII | 15 EO | 0.45 $CaSO_4 \cdot 2H_2O$ | 3.0 | 130 | 24 | 15.0 | 100 | | |
| VIII | 15 EO | 0.15 $SnSO_4$ | 1.0 | 130 | 48 | 15.0 | 100 | | 0.8 |
| IX | 15 EO | 0.075 200 Drierite | 0.5 | 130 | 24 | 13.5 | 90 | 1.9 | |
| X | 7.5 EO/7.5 gms. hexane | 0.095 C.P. $CaSO_4 \cdot 2H_2O$ | 1.0 | 130 | 24 | white solid 7.5 | 100 | 0.9 | 0.6 |
| XI | 7.5 EO/7.5 gms. diethyl ether | 0.095 C.P. $CaSO_4 \cdot 2H_2O$ | 1.0 | 130 | 24 | 7.5 | 100 | 0.53 | |
| XII | 7 EO/7.5 dioxane | 0.095 C.P. $CaSO_4 \cdot 2H_2O$ | 1.0 | 130 | 24 | 6.0 | 80 | | 0.4 |
| XIII | 15 EO | 0.3 $CaSO_4 \cdot CaO$ | 2 | 130 | 58 | 4.2 | 28 | 2.3 | 4.0 |
| XIV | 15 EO | 0.45 $CaO^* \cdot CaSO_4$ | 3 | 130 | 24 | 5.4 | 36 | 2.5 | 5.1 |

*From $CaSO_4 \cdot 2H_2O$ heated at 1,000° C. for 1 hour.

In a similar manner, other high molecular weight polyolefine oxides can be prepared employing butylene oxide or mixtures of ethylene, propylene and/or butylene oxides.

Examples XV—XXI

In order to show the effect of water content on reaction time and molecular weight, samples of $CaSO_4 \cdot 2H_2O$ were dried at various temperatures to the residual water content indicated in the following table. The $CaSO_4$, with varying water content, was then utilized as catalysts for ethylene oxide polymerization at 1 percent concentration at a temperature of 130° C. The reduced viscosity was obtained by a 0.2 percent polymer concentration in acetonitrile at 30° C.

| Example No. | Drying Temp., °C., of Catalyst | Residual $H_2O$ Content, Percent | Percent Conv. | Hrs. Time | Reduced Viscosity | Molecular Weight |
|---|---|---|---|---|---|---|
| XV | 60 | 20.8 | 95 | 6 | 1.03 | 92,000 |
| XVI | 120 | 0.5 | 99 | 6 | 1.65 | 146,000 |
| XVII | 280 | 0.3 | 93 | 3 | 4.63 | 410,000 |
| XVIII | 1,000 | *p.p.m. | 37 | 26 | 5.71 | 508,000 |
| XIX | 1,200 | *p.p.m. | [1] 89 | [1] 98 | [1] 12 | ([1]) |
| XX | 1,250 | *p.p.m. | [2] 28.7 | [2] 187 | ([2]) | ([2]) |
| XXI | 1,300 | *p.p.m. | [3] 10 | [3] 93 | ([3]) | ([3]) |

*Too small to measure.
[1] $CaSO_4 \cdot 2H_2O$ was heated to 1,200° C. for 1 hour in a muffle furnace. At 1 percent catalyst concentration, ethylene oxide was converted to a viscous liquid in 24 hours, while in 98 hours an 89 percent conversion to a hard white waxy solid resulted. This polymer had a reduced viscosity of 12.
[2] $CaSO_4 \cdot 2H_2O$ was heated to 1,250° C. for 3 hours in a muffle furnace. At 0.2 percent concentration at 0.5 percent concentration no polymerization of ethylene oxide occurred after 238 hours at 130° C. However, at 1 percent concentration a 28.7 percent conversion was obtained in 187 hours, while at 2 percent concentration, a 38.7 percent conversion was obtained in 47 hours. This polymer had a reduced viscosity of 6.78.
[3] $CaSO_4 \cdot 2H_2O$ was heated to 1,300° C. for 6 hours. This catalyst in 1 percent concentration did not polymerize ethylene oxide in 93 hours and gave a 10 percent conversion at 2 percent concentration in 70 hours. The water content was too low to be determined by a Karl Fischer water analysis.

Examples XXII–XXXIII

In the manner of Example I, employing the indicated materials, other polymers were obtained having high molecular weights in accordance with the present invention. All experiments were run at 130° C.

| Example No. | Alkylene Oxide | Catalyst Type | Catalyst Percent by Weight | Polymerization Time (hrs.) | Polymer Percent Conv. | Polymer Reduced Viscosity |
|---|---|---|---|---|---|---|
| XXII | [1] EO | $ZnSO_4$ dried 120° C | 1 | 192 | 41 | 0.12. |
| XXIII | EO | $ZnSO_4$ dried 200° C | 1 | 72 | 66 | 0.16. |
| XXIV | EO | $MgSO_4$ dried 120° C | 2 | 70 | 68 | 0.10. |
| XXV | EO | $MgSO_4$ dried 200° C | 1 | 36 | 44 | 0.32. |
| XXVI | EO | $BaSO_4$ | 1 | 24 | 46 | 1.37. |
| XXVII | EO | $BaSO_4$ | 3 | 24 | 80 | 3.26. |
| XXVIII | EO | $CaSO_4$ dried 1,000° C | 3 | 24 | 47 | 4.35. |
| XXIX | [2] PO | $CaSO_4 \cdot 2H_2O$ | 4 | 371 | 26 | (sticky white solid). |
| XXX | PO | $CaSO_4$ heated 1,000° C | 4 | 215 | 26.7 | (white paste). |
| XXXI | EO | ...do... | 1 | 50 | 58 | 12.62. |
| XXXII | EO | $CaSO_4$ heated 1,250° C | 4 | 24 | 64 | 8.3. |
| XXXIII | PO | $CaSO_4$ dried 1,200° C | 4 | 118 | 6.7 | |

[1] EO—ethylene oxide.
[2] PO—propylene oxide.

We claim:

1. The process of making high molecular weight polyolefine oxides which comprises contacting at least one olefine oxide with from 0.01 to 5.0 percent by weight, based on the olefin oxide, of a divalent metallic sulfate, said metallic sulfate being a sulfate of a divalent metal having atomic number of from 12 to 56, inclusive, at a temperature of from about 40° to about 170° C. for a time sufficient substantially to complete polymerization and separating a solid plastic polyolefine oxide from the resulting product.

2. A process as set forth in claim 1 wherein said olefinic oxide is ethylene oxide.

3. A process as set forth in claim 1 wherein said divalent metallic sulfate is calcium sulfate.

4. A process as set forth in claim 1 wherein said divalent metallic sulfate is barium sulfate.

5. A process as set forth in claim 1 wherein said divalent metallic sulfate is zinc calcium sulfate.

6. A process as set forth in claim 1 wherein said divalent metallic sulfate is magnesium sulfate.

7. A process as set forth in claim 1 wherein said temperature is about 100° to 130° C.

No references cited.